Aug. 9, 1949.  W. E. AUSTIN  2,478,173
SAFETY DEVICE FOR AIRCRAFT CONTROLS
Filed June 3, 1943

William E. Austin INVENTOR.

BY
Victor J. Evans & Co.
ATTORNEYS

Patented Aug. 9, 1949

2,478,173

UNITED STATES PATENT OFFICE 2,478,173

SAFETY DEVICE FOR AIRCRAFT CONTROLS

William E. Austin, Baltimore, Md.

Application June 3, 1943, Serial No. 489,541

1 Claim. (Cl. 74—480)

The invention relates to a safety device designed especially for aircraft control mechanism.

The primary object of the invention is the provision of a device of this character which, when installed in association with the controls for the pilot and co-pilot of an airplane, will in the event of the injury or death of either permit the airplane to be readily controlled by the remaining pilot or other occupant of the airplane.

Another object of the invention is the provision of a safety device of this character, wherein airplanes with dual control for operating the same can be selectively rendered inoperative so as to avoid ineffectiveness in the operation of the machine where one of the pilots is killed and the body of the latter accidentally falls on the controls which would result in the jamming thereof and thus rendering the dual control inoperative with the result of the destruction of the craft and possibly killing the crew aboard the same. In other words, where an aircraft is equipped with dual controls either one of such controls can be thrown out of operation so that the control remaining operative may be handled for the successful flight of the aircraft.

A further object of the invention is the provision of a device of this character wherein the body of a dead pilot falling upon the controls of the dual type enables a co-pilot to throw out that control affected by the falling dead body which would jam the same and thus enabling the live pilot to master the operation of the airplane and carry the same safety in its flight. This device also is adaptable for use in training airplanes, particularly where the airman being trained becomes frightened and incapable of actuating his control the latter can be cut out of service, so that the teaching pilot will have full control in the operation of the airplane.

A further object of the invention is the provision of a device of this character which is simple in construction, clearly effective in its operation, and inexpensive to manufacture and install.

With these and other objects in view, the invention consists in the features of construction, combination and arrangement of parts as will be hereinafter more fully described in detail, illustrated in the accompanying drawings, which discloses the preferred embodiment of the invention and pointed out in the claims hereunto appended.

In the accompanying drawings.

Similar reference characters indicate corresponding parts throughout the several views in the drawing.

Figure 1:
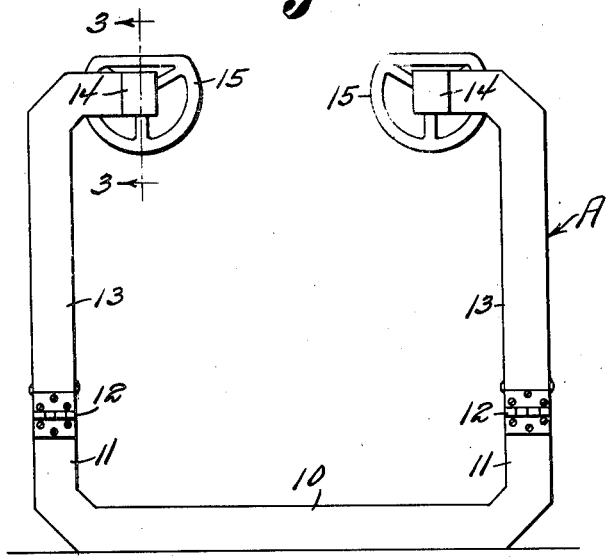
Figure 1 is an elevation of a dual control for piloting an airplane, and has in association therewith the safety device in accordance with the invention.
Figure 2:
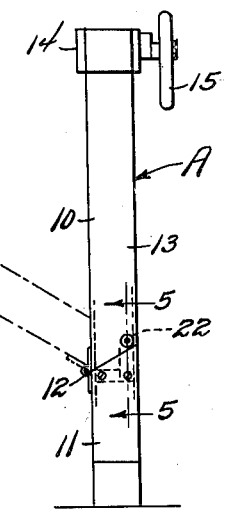
Figure 2 is a side elevation showing by full lines the normal working position of the control and by dotted lines the disturbed position thereof.

Referring to the drawing in detail A designates generally a dual control set up for operating an airplane and such dual control in its set up are for a pilot and co-pilot service and in this instance involves a vertical double arm frame 10, the double arms 11 of which have hinged thereto at 12 upstanding supporting posts or uprights 13, these being fitted with terminal housings 14 for the controls for a pilot and co-pilot. Each control involves a steering wheel 15 provided with a segment 16. The segment is engageable by an electric magnet locking armature 17, the magnet 18 of which is confined within the housing 14 and is in an electric circuit 19. The wheel 15 with its segment 16 is mounted loosely upon a shaft 20 and this shaft is included in the control mechanism, the magnet 18 being fixed to the shaft 20 and its armature 17 when engaged with the segment 16, locks the wheel 15 to the shaft 20. When the armature 17 is released from the segment 16 the said wheel 15 is unclutched or released from the shaft 20, so that the latter cannot be operated by the wheel 15.

The electric circuit 19 includes a hand switch 21 to be manually operated by a pilot. The circuit 19 is a two-way control circuit so that there is a switch 21 for each control conveniently located on the housings 14 therefor.

Located at the hinged point of each post or column 13 is a double armature electric magnet or solenoid 22, the armatures 23 of which being adapted to lock with keepers 24 fixed to the frame arms 11, the magnets or solenoids 22 being fitted in the posts or columns 13 and are included in the circuit 19. Each magnet 18 and 22 has the armatures thereof extended to locking position by coil expansion springs 25, 25', while on energizing the said magnet the armatures are drawn inwardly thereof for the unlatching of their armatures to release the wheel 15 and also to permit the tilting of the column or post 13. The magnets 22 are included in the circuit 19 and this circuit is of the kind to permit the selective throwing out or rendering inoperative of one control and permitting the other control to remain in or operative. In the use of the safety device with a dual control for an airplane, both control wheels are normally operative for use by a pilot and co-pilot. Now should either one of the pilots become injured or killed the remaining live pilot of the airplane can throw out or render inoperative that control being serviced by the killed or injured pilot as such control might be jammed or otherwise rendered inoperative especially if the pilot should fall upon the same and thereby render the airplane uncontrollable, the throwing out or rendering inoperative of the affected control is had by the living or normal pilot closing the switch 21 which is located convenient to him at his control and in so doing the circuit 19 will close to operate the magnets 18 and 22 only at the affected control, so that this control will be rendered inoperative without disturbing the remaining controlling of the dual set up.

The safety device is not limited in its use for a dual control as the same can be set up for a third set of controls so that in the event that both pilots be killed a third member of the crew of the airplane could have a set of controls by which he could assume control of the airplane. Each circuit is provided with a time switch 31 which may be of any well known construction. Each time switch opens its circuit at a predetermined period of time after the closing of the switch 21 of the circuit. The actuated cores or bolts are held from returning to latching position by the shutters associated therewith.

The tilting post or column 13 enables it to be thrown out of operative position with respect to the steering wheel 15 and displacing the latter from the pilot's seat to relieve any possibility of the jamming of the control should the killed pilot fall upon the wheel, the tilting post or column being moved outwardly or away from the pilot's seat companion thereto.

Figure 3:
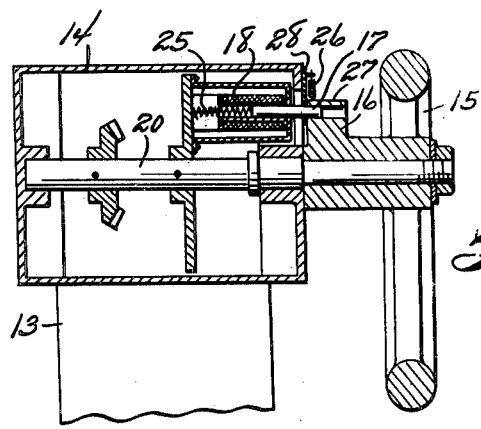
Figure 3 is an enlarged fragmentary sectional view taken on the line 3—3 of Figure 1, looking in the direction of the arrows.

In Figure 3 of the drawing there is shown a spring 26 which is connected to the keeper 27 on the wheel 15 and also connected to a shutter 28 on the housing 25 and such spring functions to move the shutter 28 downwardly when the armature 17 has been retracted or unlatched from the keeper so as to prevent the relatching action of this armature when the solenoid is deenergized and the spring 25 active upon such armature, thus the wheel 15 is free of the shaft 20 and thus unlatched therefrom until the said shutter 28 is in a position to permit the armature 26 to engage the keeper.

Figure 5:
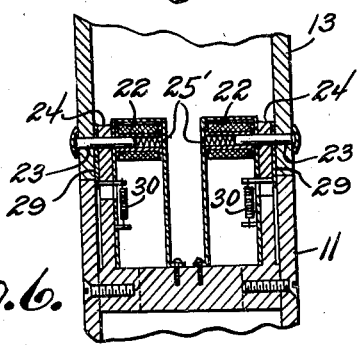
Figure 5 is an enlarged detail sectional view taken on the line 5—5 of Figure 2, looking in the direction of the arrows.
Figure 6:
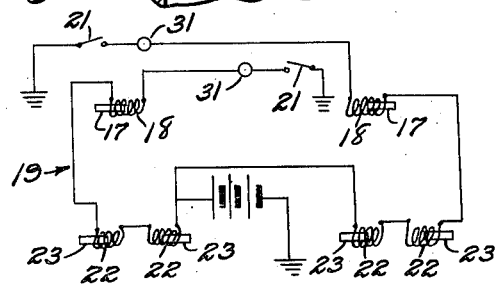
Figure 6 is a diagrammatic detail view of the electric circuit layout of the safety device.
Figure 4:
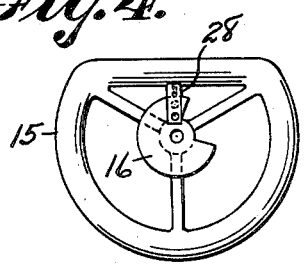
Figure 4 is a detail plan view of the control wheel.

In Figure 5 of the drawing there is arranged a pair of shutters 29 which move downwardly into the path of the armatures 23 when the latter are released or unlatched to eliminate relatching thereof. These shutters 29 have connected thereto the springs 30 which are also fixed to the interior of the post or columns 13. These shutters 29 function identically with the shutter 28 hereinbefore described.

I claim:

Means for disconnecting the dual controls of an airplane, comprising a pair of standards, each of which is provided with a hinged joint, a control means mounted at the top of each standard, a segment formed on each control means forwardly thereof, an electrical device mounted on each standard, a movable element in each electrical device, spring means acting on said element normally urging said element into engagement with the segment of each control means for holding said control means in operative condition, a housing on each standard containing said electrically energized device for moving each of said elements to selectively release either of said control means to place said control means in inoperative position, means for retaining each of said elements in inoperative position, and an electric circuit in which each of said element moving means are interconnected, and switch means for making and breaking the circuit.

WILLIAM E. AUSTIN.

REFERENCES CITED

The following references are of record in the file of this patent:

UNITED STATES PATENTS

| Number | Name | Date |
|---|---|---|
| 921,989 | Hendry | May 18, 1909 |
| 1,054,917 | Gunn | Mar. 4, 1913 |
| 1,246,025 | Kleckler | Nov. 6, 1917 |
| 1,330,664 | Verner | Feb. 10, 1920 |
| 1,669,753 | Hoefler | May 15, 1928 |
| 1,821,581 | Rosatelli | Sept. 1, 1931 |
| 1,827,933 | Davis | Oct. 20, 1931 |
| 1,968,554 | Hermandey | July 31, 1934 |
| 2,008,693 | Fator | July 23, 1935 |
| 2,079,824 | Smeaton et al. | May 11, 1937 |
| 2,130,559 | Papp | Sept. 20, 1938 |
| 2,153,088 | Knell | Apr. 4, 1939 |